United States Patent [19]

Drujon et al.

[11] Patent Number: 5,567,530
[45] Date of Patent: Oct. 22, 1996

[54] METHOD OF TREATMENT OF A PANE FOR THE BONDING OF A PERIPHERAL PROFILE

[75] Inventors: Frederic Drujon, Machemont; Gerard Daude, Villenave d'Ornon; Cecile Gosse, Compeigne, all of France

[73] Assignee: Saint Gobain Vitrage International, Courbevoie, France

[21] Appl. No.: 168,193

[22] Filed: Dec. 17, 1993

[30] Foreign Application Priority Data

Dec. 18, 1992 [FR] France .................................. 92 15292

[51] Int. Cl.$^6$ ...................................................... B32B 9/00
[52] U.S. Cl. ........................ 428/429; 428/192; 428/432; 428/447
[58] Field of Search .............................. 428/432, 34, 192, 428/429, 81, 141, 426, 428, 446, 447

[56] References Cited

U.S. PATENT DOCUMENTS

| | | | |
|---|---|---|---|
| 3,341,399 | 9/1967 | Hazdra et al. | 428/437 |
| 3,391,053 | 7/1968 | Kolb | 428/419 |
| 3,881,043 | 4/1975 | Rieser et al. | 428/81 |
| 4,146,585 | 3/1979 | Ward et al. | 260/827 |
| 4,230,769 | 10/1980 | Goossens | 428/412 |
| 4,716,070 | 12/1987 | Duck et al. | 428/192 |
| 4,735,830 | 4/1988 | Oezelli et al. | 427/407.2 |
| 5,061,531 | 10/1991 | Catalano | 428/34 |
| 5,120,379 | 6/1992 | Noda et al. | 428/34 |

FOREIGN PATENT DOCUMENTS

| | | |
|---|---|---|
| 0040469 | 11/1981 | European Pat. Off. . |
| 0253770 | 1/1988 | European Pat. Off. . |
| 0378462 | 7/1990 | European Pat. Off. . |
| 0487377 | 5/1992 | European Pat. Off. . |
| 1426058 | 4/1960 | France . |

*Primary Examiner*—Donald Loney
*Attorney, Agent, or Firm*—Oblon, Spivak, McClelland, Maier & Neustadt, P.C.

[57] ABSTRACT

The invention pertains to a method of treatment of a pane for improving the bond of a peripheral profile, notably of a molded-on profile. The method according to this invention consists of treating at least a part of one face of the pane with at least one silane and a composition capable of forming a film having free OH groups.

38 Claims, No Drawings

5,567,530

METHOD OF TREATMENT OF A PANE FOR THE BONDING OF A PERIPHERAL PROFILE

This application claims priority under 35 U.S.C. §119 to French patent application FR 92 15292 filed Dec. 18, 1992, which is herein incorporated by reference.

BACKGROUND OF THE INVENTION

1. Field of the Invention

This invention relates to a method for the treatment of a monolithic or laminated glass pane for the bonding of a peripheral profile and, more precisely, of a moulded-on peripheral profile (or encapsulating seal). This treatment may also be applied for the bonding, onto a pane, of a profile deposited by extrusion.

2. Description of the Related Art

This type of profile is generally manufactured and mounted on the pane by the pane manufacturer. The panes are then delivered, notably to automobile manufacturers. The latter can then mount the encapsulated panes directly in bodywork openings, for example through the use of adhesives.

Through the use of such encapsulated panes, the addition of a finishing seal is avoided. The use of panes of this type enables the number of installation steps and the thus costs for the automobile manufacturer to be reduced. In the interests of simplification, the remainder of the disclosure will relate more specifically to a treatment for the bonding of moulded-on profiles or encapsulating seals.

The encapsulating seals may be of different types. There may be a profile of polyurethane, which is produced by thermoplastic injection moulding or by reaction injection moulding (RIM). It may be a profile produced by thermoplastic injection moulding of other thermoplastic materials, such as a thermoplastic elastomer, in particular olefinic or styrenic elastomers.

The profile may also be a profile of PVC produced by thermoplastic injection moulding; or by the reduced pressure injection moulding of a mixture, having the appropriate viscosity, of a PVC containing a catalyst which is afterwards activated by a high frequency, very high frequency or ultra-high frequency electromagnetic radiation. The latter products are generally termed "plastisols".

The profile or encapsulating seal is most commonly moulded onto the entire periphery of the pane. During the production of this profile, the adhesion between the profile and the glass is not always satisfactory, and can decrease over the course of time.

When the bonding of the pane onto the bodywork opening is achieved by deposition of an adhesive cord onto the pane itself in the area bordering the moulded-on profile, then the profile fulfills only a sealing and aesthetic function. In contrast, however, when the adhesive cord is deposited onto the moulded-on profile, the connection between the pane and the bodywork opening requires the bond between the pane and the moulded-on profile to be very strong and durable, as this bond becomes an important part of the structure itself. Furthermore, the bonds between the profile and the glass have, in the past, not been adequate for ensuring complete leaktightness. For these reasons, attempts have been made to improve the adhesion between the pane and the moulded-on profile.

In one such process, panes are coated with an adhesion agent or primer solution, which enables a stronger bond to be created between the glass and the plastic material. A technique of this type is already in use, notably in the automobile industry. The technique consists of two steps. In the first step, a silane layer is deposited in such a way as to create a link with the glass, then in a second step a primer solution is deposited. It is then possible to produce the moulded-on profile according to one of the techniques listed above. It has been observed, however, that in order to obtain good adhesion, it is necessary to apply the moulded-on profile during the first few hours following coating with the primer solution.

In the case where the manufacturer stores the coated panes for a considerable period of time before the application of the moulded-on profile, acceptable adhesion is obtained only if the primer is reactivated. This therefore necessitates a supplementary step before proceeding with the production of the moulded-on profile.

Of course, the panes could be silane treated and then stored prior to coating with the primer solution. With this procedure, however, it is still necessary to proceed with a preliminary step just before the manufacture of the moulded-on profile. This process has not previously been used.

OBJECTS OF THE INVENTION

This invention has as its objective, a method for the treatment of a pane which allows the bonding of a moulded-on profile at the periphery of said pane after storage of long duration between the treatment phase and the manufacturing phase of the moulded-on profile. These and other objectives are obtained by a method of treatment of a pane for the purpose of improving the bond of a moulded-on profile at the periphery of said pane, comprising treating at least the peripheral zone of one face of the pane with at least one silane and a composition capable of forming a film having free OH groups.

SUMMARY OF THE INVENTION

The subject invention therefore pertains to a method of treating a monolithic or laminated glass pane to improve the bond strength of a profile moulded onto the periphery thereto, the improvement comprising treating at least a part of the zone of the pane intended to be covered by the moulded-on profile with at least one silane and a composition capable of forming a film having free OH groups.

DESCRIPTION OF THE PREFERRED EMBODIMENTS

The treatment of a single face of the pane may be sufficient, notably in the case in which the moulded-on profile partly covers only one face of the pane. In the case of a moulded-on profile partly covering both faces of the pane, it is preferable to improve the bond over the entire contact zone of the profile with the pane and therefore to treat both faces.

According to a preferred method of the invention, the pane is treated on both faces and principally at the periphery.

Generally speaking, the panes intended to be mounted in a bodywork opening comprise an enamelled strip around their entire periphery on the face towards the vehicle interior. This enamelled strip serves, notably, for masking the adhesive cord used for mounting and provides a protection for the adhesive against ultraviolet radiation. It is advantageous to carry out the aforesaid treatment on the enamel strip as well as the corresponding zone on the opposite side of the pane.

In a first variant, the treatment consists of depositing a silane-based film, over which is deposited and at least partly polymerized, a composition capable of forming a film having free OH groups. In a second variant it is possible to carry out the treatment in a single step. For this purpose the silanes are introduced into the composition which, after partial or complete polymerization, is capable of forming a film having free OH groups.

The silanes are advantageously chosen from the family of the aminosilanes, the mercaptosilanes, the epoxysilanes, the vinylsilanes the isocyanatosilanes and the like. Preferable are silanes such as methacryl-3-propyltrimethoxysilane, vinyltrimethoxysilane, 3-glycidoxypropyltriethoxysilane, 3-mercaptopropyltrimethoxysilane, 3-aminopropyltris(2-methoxyethoxyethoxy)silane, 3-mercaptopropyltriethoxysilane, and a mixture of mercaptomethyltriisopropoxysilane, mercaptopropyltriisopropoxysilane, aminoethyl-γ-aminoethyltriisopropoxysilane, and aminoethyl-γ-aminopropyltriisopropoxysilane. Mixtures of the various silanes may be used. When applied separately, the silane or mixture of silanes is preferably dissolved in an anhydrous, volatile solvent in a concentration of from 0.1% to about 5% by weight. Suitable solvents include the alcohols, for example isopropanol. Ketonic solvents are also useful, for example methylethylketone. The solution may be merely wiped on followed by wiping off. In such a manner, thin films approaching a monolayer may be obtained. When added to the hydroxyl-functional coating components as in the one step method, the amount of silane again is within the range of 0.1 weight % to about 5 weight %.

Cure of the silane may be performed by a heat treatment at high temperature and of short duration, for example at a temperature of approximately 80° to 120° C. over a time of the order of one to several minutes. The polymerization may also be carried out at temperatures commonly referred to as ambient temperatures, that is to say approximately 20° to 25° C., but for a much longer duration, for example, 24 hours or so.

Between these two polymerization conditions it is possible to envisage many other thermal polymerization cycles. The advantage of a rapid polymerization lies essentially in a much greater ease of handling a treated pane. It is also possible to use, if applicable, other types of polymerization, for example through the use of microwaves, vapor phase catalysis, actinic radiation, etc.

The composition capable of forming a film having free OH groups may comprise the basic components for forming a hydroxyl-terminated polyurethane, the polyol component being taken in excess. In terms of equivalents with respect to the isocyanate component, the ratio of NCO groups to OH groups is less than 1, and preferably lies within the range of 0.3 and 0.99 (30–99 index).

The free-hydroxyl group film-forming composition may also be a composition containing a two-component epoxy resin, or may be a polyoxazolidone resin obtained by condensation of an isocyanate with an excess of epoxy resin in the presence of a catalyst of the quaternary ammonium salt type.

The isocyanate component may be chosen from among the aliphatic or aromatic difunctional isocyanates such as hexamethylene diisocyanate, 2,2,4-trimethyl-1,6-hexamethylene diisocyanate, bis(4-isocyanatocyclohexyl)methane, 1-isocyanato-3-isocyanatomethyl-3,5,5-trimethylcyclohexane (isophorone diisocyanate, IPDI), toluene diisocyanate (TDI), and isocyanates having a functionality greater than 2 such as the biuret modified isocyanates, the isocyanurate-modified isocyanates, and polymeric diisocyanatodiphenylmethane (polymeric MDI) having a functionality between 2 and 3, etc.

The polyol component preferably comprises at least one polyol chosen from among the long chain polyols having molecular weights between about 400 and about 4,000, particularly polyether diols, polyester diols, and polycaprolactone diols.

Advantageously, the polyol component comprises at least one diol having a molecular weight of less than 400, chosen from among those generally used as chain extenders in the preparation of polyurethanes, for example, ethylene glycol, 1,2-propanediol, 1,3-propanediol, 1,2-, 1,3- and 1,4-butanediol, 2,2-dimethyl-1,3-propanediol (neopentyl glycol), 1,5-pentanediol, 1,6-hexanediol, 1,8-octanediol, 1,10-decanediol, 1,12-dodecanediol, cyclohexanedimethanol, bisphenol A, 2-methylpentane-2,4-diol, 3-methylpentane-2,4-diol, 2-ethylhexane-1,3-diol, 2,2,4-trimethyl-1,3-pentanediol, diethylene glycol, triethylene glycol, tetraethylene glycol, 2-butyne-1,4-diol, 2-butene-1,4-diol and decynediol, all these substituted and/or oxyalkylated; hydroquinone-bishydroxyethylether, bisphenol A, these being oxyalkylated with from two to four propylene oxide units, and dimethylol propionic acid.

The polyol component may also comprise a polyol having a functionality greater than 2, such as aliphatic triols, monomers such as glycerol, trimethylolpropane, triols with polyether chains, and polycaprolactone triols, and having a molecular weight generally between 90 and 1,000; and mixed polyether/polyester polyols having a functionality greater than 2, for example those having a functionality of between 2 and 3.

The polyol having a functionality greater than 2 may be used alone, notably when its molecular weight is greater than about 400. In a variant it may be used in a mixture with at least one difunctional long chain polyol and/or with at least one short diol.

One of the essential characteristics of the invention is the presence of OH groups at the surface of the treated moulded-on profile. These OH groups in excess must be stable, that is to say they must retain their reactivity during storage, even prolonged storage, so that they can later react with the free NCO groups of the moulded-on profile.

The treatment process for the pane thus proposed is entirely satisfactory for the production of moulded-on profiles by RIM or by thermoplastic injection moulding. The method is also satisfactory in the case of production of moulded-on profiles based on thermoplastic elastomers by thermoplastic injection moulding. This method is suitable also for the bonding of a peripheral profile of the polyurethane type deposited by extrusion on the pane.

However, when a moulded-on profile of PVC is produced, it is found that the bond is not always ideal. In fact, it is possible for the bond to be inadequate right from the start, or at any rate the bond does not last with time.

For the purpose of improving the adhesion of moulded-on profiles of PVC in one variant of the composition suitable for forming a film having free OH groups, the polyol component comprises at least one copolymer of polyvinyl chloride (PVC) having free hydroxyl groups.

As an example of a suitable PVC copolymer having hydroxyl groups, there may be used vinyl resins having the following general structure:

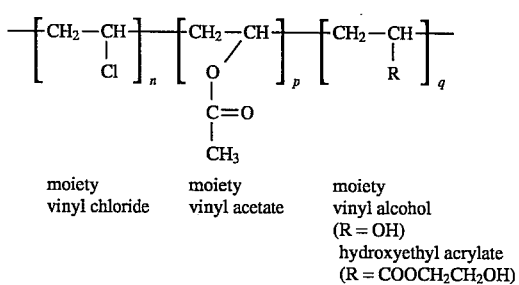

moiety vinyl chloride  
moiety vinyl acetate  
moiety vinyl alcohol (R = OH)  
hydroxyethyl acrylate (R = COOCH$_2$CH$_2$OH)

and having a molecular weight between about 1,000 and about 100,000, preferably between about 2,000 and about 50,000, the vinyl chloride moiety corresponding to approximately 20 to 95% by weight, the vinyl acetate moiety corresponding to approximately 2 to 40% by weight and the vinyl alcohol or hydroxyethyl acrylate moiety corresponding to approximately 2 to 40% by weight.

Advantageously, the polyol component may contain, in addition to the copolymer of PVC type having hydroxyl groups, at least one other polyol from among those listed above. Preferably, the copolymer of PVC type having hydroxyl groups represents from 0.1 to about 1 equivalent of OH groups for each equivalent of the total polyol component.

The proportion between the number of OH equivalents provided by the PVC having OH groups (PVC-OH) and the number of OH equivalents provided by the other polyol or polyols generally depends upon the molecular weight of the PVC-OH used. Thus, the number of OH equivalents provided by the PVC-OH will generally be smaller, the higher its molecular weight, this being for a given percentage by weight of the vinyl alcohol moiety or hydroxyethylacrylate moiety. It will be understood that, the higher the number of free OH groups in a given PVC-OH, the more reactive the product will be.

This variant of the composition is advantageously used for obtaining the adhesion of a moulded-on profile of PVC to the pane, the moulded-on profile being produced either by thermoplastic injection moulding; or by injection moulding under reduced pressure of a mixture, having the appropriate viscosity, of a PVC with a catalyst, the latter commonly known by the term "plastisol".

However, this composition, comprising a copolymer of the PVC type, may also be used for the bonding of a profile of polyurethane produced by thermoplastic injection moulding or by reaction injection moulding (RIM), or for the adhesion of a profile produced by thermoplastic moulding of other thermoplastic materials, such as thermoplastic elastomers, or further for the adhesion of a peripheral profile deposited by extrusion on the pane.

The process according to this invention thus described, whether carried out in two steps, or in a single step as in the case in which the silanes are introduced into the composition capable of forming a film having free OH groups, enables excellent bonding of a moulded-on profile to a pane, even in the case where the pane is stored between the treatment phase and the production phase of the moulded-on profile.

The preferred method of treatment of the pane according to this invention consists of depositing the silanes and the priming composition onto each of the faces on which zones intended to be covered by the moulded-on profile are located.

It may be advantageous, on at least that face of the pane intended to be towards the interior of the vehicle, not to limit the deposition to that zone which will be covered by the moulded-on profile, but to perform a deposition over a larger zone and to cover at least the entire enamelled strip which is on this same face. Since the primer composition remains reactive even after long storage, it can be used for the bonding, onto the pane, of an adhesive cord used for fixing the pane in the bodywork opening of an automobile vehicle.

Another advantage, in the case in which the silanes are not introduced into the primer composition, is to be able to use the primer compositions described according to this invention for the bonding of an adhesive cord, serving for the mounting of the pane, onto the moulded-on profile itself.

To facilitate the deposition and the formation of the coating film according to this invention, there is generally prepared a solution of the reaction composition intended for forming a polyurethane having free OH groups. For this purpose, a solvent is added, for example methyl ethyl ketone or methyl isobutyl ketone or other ketones. The concentration of the solution of the reaction mixture depends upon the thickness desired for the coating film. This concentration is generally between 5 and 50% by weight. The deposition of the coating film according to this invention is generally between 10 and 50 µm.

Other characteristics and advantages of the invention will become apparent from the following description of examples according to the invention, which should not be construed as limiting the scope of the invention in any way.

EXAMPLE 1

An encapsulated pane for automobile vehicle, for example a fixed side window pane, is produced.

For this purpose, the enamelled zone of the pane intended to he covered by the profile is coated with the primer composition. The temperature of the glass is then raised to 140° C. The moulded-on profile is then formed. The moulded-on profile is produced by the reaction injection moulding method using conventional components suitable for forming a profile or seal of polyurethane. The bond obtained may be evaluated by a peeling test on a specimen composed of a tongue, 2 cm in width, of the material forming the encapsulating profile.

The bond strength as measured by peeling at 180° C., is evaluated just after manufacture. The adhesion obtained is Ho, expressed in N/cm.

A value of 50N/cm is considered to correspond to a good bond.

Test No. 1

The priming composition used is a mixture of a polymeric methylenediphenyldiisocyanate component having a functionality between 2 and 3, and a polyol component comprising a polyoxypropylene glycol of molecular weight 440 and 1,4-butanediol, in quantities such that, to 0.8 equivalents isocyanate, there corresponds 1 OH equivalent of polyol component, of which 0.3 equivalents is provided by the polyoxypropylene glycol and 0.7 equivalents provided by the 1,4-butanediol.

The composition is employed along with a silane. The treatment is carried out either in one step, the silane being in the primer composition, or in two steps consisting of a first deposition of the silane and then a second deposition of the primer composition.

The values obtained are:

1 step: Ho>50N/cm 2 steps: Ho>50N/cm.

Test No. 2

The priming composition used is formed of a mixture of a polymeric methylenediphenyldiisocyanate component having a functionality of between 2 and 3, and a polyol component which is a hydroxyl functional PVC having a molecular weight of approximately 5,500 and having the general formula:

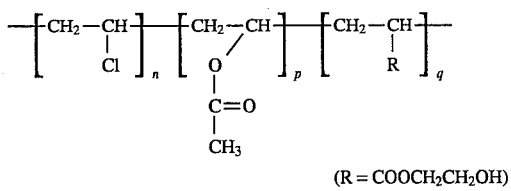

(R = COOCH$_2$CH$_2$OH)

in which the vinyl chloride moiety represents approximately 67% by weight of the polymer, the vinyl acetate moiety represents approximately 11% by weight, and the acrylate moiety represents approximately 22% by weight.

The components are used in quantities such that to 0.8 equivalents isocyanate, there corresponds 1 OH equivalent PVC. The composition also contains dibutyl tin dilaurate as catalyst for the polyurethane, in a proportion of 0.03% of the weight of the components of the polyurethane.

The composition applied is preferably in the form of a solution of the mixture described above in methyl ethyl ketone, the concentration of the reaction mixture being approximately 25% by weight.

The composition is associated with a silane. The treatment is carried out either in a single step, the silane being in the primer composition, or in two steps, consisting of a first deposition of the silane and then a second deposition of the primer composition.

The values obtained are:

1 step: Ho>80N/cm 2 steps: Ho>100N/cm.

EXAMPLE 2

The same tests were carried out for the purpose of improving the bond of an adhesive cord to the glass.

The adhesive cord used is a seal sold commercially under the name BETASEAL HV3.

Test No. 1

The priming composition is that of Test No. 1 of Example 1.

The values obtained are:

1 step: Ho>100N/cm 2 steps: Ho>100N/cm.

Test No. 2

The priming composition is that of Test No. 2 of Example 1.

The values obtained are:

1 step: Ho>100N/cm 2 steps: Ho>100N/cm.

The priming compositions tested may therefore advantageously be used for improving the bond of a moulded-on profile to a pane, or for improving the bond of an adhesive cord to the glass.

Having now fully described the invention, it will be apparent to one of ordinary skill in the art that many changes and modifications can be made thereto without departing from the spirit or scope of the invention as set forth herein.

What is claimed is:

1. A monolithic or laminated glass pane, produced by a method comprising treating at least a part of a zone of the pane intended to be covered by a molded-on profile with at least one silane and a composition which forms a film having free OH groups, wherein the composition comprises a polyol component and an isocyanate component, the polyol component being taken in excess relative to the isocyanate component.

2. A monolithic or laminated pane according to claim 1, wherein said profile is produced by a process selected from the group consisting of thermoplastic injection molding, reaction injection molding, and injection molding of a PVC with a catalyst under reduced pressure.

3. A monolithic or laminated pane provided with a molded-on profile accordingly to claim 2, wherein the pane has two faces and both faces of the pane are treated at least at the periphery of said pane.

4. A monolithic or laminated pane provided with a molded-on profile according to claim 2, wherein said pane further comprises an enameled strip along the periphery of the pane, and said method further comprises treating at least one part of said peripheral enameled strip with said at least one silane and said composition.

5. A monolithic or laminated pane according to claim 2, wherein said treating comprises:

depositing a first film of said at least one silane on said pane; and depositing a second film of said composition on said first film;

wherein said composition is partly polymerized.

6. A monolithic or laminated pane according claim 5, wherein the composition is polymerized by a heat treatment.

7. A monolithic or laminated pane according to claim 5, wherein the composition is polymerized at ambient temperature.

8. A monolithic or laminated pane accordingly to claim 2, wherein said treating comprises:

depositing a film of a mixture on said pane;

wherein said mixture comprises said composition and said at least one silane, and said composition is at least partly polymerized.

9. A monolithic or laminated pane according to claim 8, wherein the composition is polymerized by a heat treatment.

10. A monolithic or laminated pane according to claim 8, wherein the composition is polymerized at ambient temperature.

11. A monolithic or laminated pane according to claim 2, wherein a silane is selected from the group consisting of the amino-silanes and the isocyanatosilanes.

12. A monolithic or laminated pane according to claim 2, wherein the ratio of the NCO groups of the isocyanate to OH groups of the polyol is from 0.3 to 0.99.

13. A monolithic or laminated pane according to claim 12, wherein the isocyanate component of the composition is methylene diphenyl diisocyanate.

14. A monolithic or laminated pane according to claim 12, wherein the polyol component of the composition comprises at least one long chain polyol.

15. A monolithic or laminated pane according to claim 12, wherein the polyol component of the composition comprises at least one short diol having a molecular weight less than 400.

16. A monolithic or laminated pane according to claim 12, wherein the polyol component of the composition comprises at least on polyol having a functionality greater than 2.

17. A monolithic or laminated pane according to claims 12, wherein the polyol component of the composition comprises at least one polyvinyl chloride copolymer having free hydroxyl groups.

18. A monolithic or laminated pane according to claim 17, wherein the PVC copolymer having hydroxyl groups has the following formula:

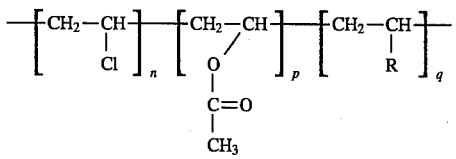

wherein R is selected from the group consisting of —OH and —COOCH$_2$CH$_2$OH, and wherein n, p, and q are such that the copolymer has a molecular weight of between about 1,000 and about 100,000, and the composition contains monomer moieties such that the vinyl chloride moiety corresponding to approximately 20 to 95% by weight, the vinyl acetate moiety corresponding to approximately 2 to 40% by weight and the vinyl alcohol or hydroxyethyl acrylate moiety corresponding to approximately 2 to 40% by weight.

19. A monolithic or laminated pane according to claim 1, wherein the pane has two faces and both faces of the pane are treated at least at the periphery of said pane.

20. A monolithic or laminated pane according to claim 1, wherein said pane further comprises an enameled strip along the periphery of the pane, and said method further comprises treating at least one part of said peripheral enameled strip with said at least one silane and said composition.

21. A monolithic or laminated pane according to claim 1, wherein said treating comprises:
depositing a first film of said at least one silane on said pane; and
depositing a second film of said composition on said first film;
wherein said composition is partly polymerized.

22. A monolithic or laminated pane according to claim 21, wherein the composition is polymerized by a heat treatment.

23. A monolithic or laminated pane according to claim 21, wherein the composition is polymerized at ambient temperature.

24. A monolithic or laminated pane accordingly to claim 1, wherein said treating comprises:
depositing a film of a mixture on said pane;
wherein said mixture comprises said composition and said at least one silane, and
said composition is at least partly polymerized.

25. A monolithic or laminated pane according to claim 24, wherein the composition is polymerized by a heat treatment.

26. A monolithic or laminated pane according to claim 24, wherein the composition is polymerized at ambient temperature.

27. A monolithic or laminated pane according to claim 1, wherein a silane is selected from the group consisting of the amino-silanes and the isocyanatosilanes.

28. A monolithic or laminated pane according to claim 1, wherein the ratio of the NCO groups of the isocyanate to OH groups of the polyol is from 0.3 to 0.99.

29. A monolithic or laminated pane according to claim 28, wherein the isocyanate component of the composition is methylene diphenyl diisocyanate.

30. A monolithic or laminated pane according to claim 28, wherein the polyol component of the composition comprises at least one long chain polyol.

31. A monolithic or laminated pane according to claim 28, wherein the polyol component of the composition comprises at least one short diol having a molecular weight less than 400.

32. A monolithic or laminated pane according to claim 28, wherein the polyol component of the composition comprises at least on polyol having a functionality greater than 2.

33. A monolithic or laminated pane according to claim 28, wherein the polyol component of the composition comprises at least one polyvinyl chloride copolymer having free hydroxyl groups.

34. A monolithic or laminated pane according to claim 33, wherein the PVC copolymer having hydroxyl groups has the following formula:

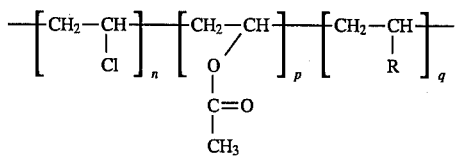

wherein R is selected from the group consisting of —OH and —COOCH$_2$CH$_2$OH, and wherein n, p, and q are such that the copolymer has a molecular weight of between about 1,000 and about 100,000, and the composition contains monomer moieties such that the vinyl chloride moiety corresponding to approximately 20 to 95% by weight, the vinyl acetate moiety corresponding to approximately 2 to 40% by weight and the vinyl alcohol or hydroxyethyl acrylate moiety corresponding to approximately 2 to 40% by weight.

35. A monolithic or laminated pane produced by a method comprising treating at least the peripheral zone of one face of the pane with at least one silane and a composition which forms a film having free OH groups,
wherein the composition comprises a polyol component and an isocyanate component, the polyol component being taken in excess relative to the isocyanate component.

36. A monolithic or laminated pane provided with a molded-on profile, comprising:
said pane;
said profile; and
a treating substance, between and in contact with, both said pane and said profile;
wherein said treating substance comprises at least one silane and a composition capable of forming a film having free OH groups, and
the composition comprises a polyol component and an isocyanate component, the polyol component being taken in excess relative to the isocyanate component.

37. A monolithic or laminated pane provided with a molded-on profile according to claim 36, wherein
said treating substance comprises a first layer and a second layer;
said first layer is in contact with said pane, and comprises said at least one silane; and
said second layer is in contact with said profile, and comprises said composition.

38. A monolithic or laminated pane provided with a molded-on profile according to claim 36, wherein said treating substance comprises only a single layer.

* * * * *